United States Patent [19]

Fennel

[11] Patent Number: 4,701,855

[45] Date of Patent: Oct. 20, 1987

[54] METHOD AND CIRCUIT CONFIGURATION FOR SUPPRESSING UNDESIRED CONTROL ACTIONS IN SLIP-CONTROLLED BRAKE SYSTEMS

[75] Inventor: Helmut Fennel, Bad Soden, Fed. Rep. of Germany

[73] Assignee: ITT Industries, Inc., New York, N.Y.

[21] Appl. No.: 678,252

[22] Filed: Dec. 5, 1984

[30] Foreign Application Priority Data

Dec. 17, 1983 [DE] Fed. Rep. of Germany ....... 3345729

[51] Int. Cl.$^4$ .............................................. B60T 8/32
[52] U.S. Cl. ..................................... 364/426; 303/97; 303/105; 180/197
[58] Field of Search ................ 364/426, 424; 180/197; 303/91, 97, 99, 105, 108

[56] References Cited

U.S. PATENT DOCUMENTS

| | | | |
|---|---|---|---|
| 4,039,227 | 8/1977 | Sivulka | 303/97 |
| 4,076,332 | 2/1978 | Taylor et al. | 303/97 |
| 4,136,912 | 1/1979 | Hesse et al. | 364/426 |
| 4,140,353 | 2/1979 | Riordan | 303/97 |
| 4,146,276 | 3/1979 | Brearley et al. | 303/97 |
| 4,193,642 | 3/1980 | Miller | 303/97 |
| 4,260,200 | 4/1981 | Brearley et al. | 303/97 |
| 4,497,026 | 1/1985 | Braschel et al. | 364/426 |

Primary Examiner—Felix D. Gruber
Assistant Examiner—Thomas G. Black
Attorney, Agent, or Firm—James B. Raden

[57] ABSTRACT

A method and a circuit configuration for suppressing undesired control actions in slip-controlled brake systems, which, for example, may be caused by oscillations of the axle. The wheel rotational behavior is determined and the braking pressure is controlled in dependence upon slip criteria and/or acceleration criteria, and slip control commences when predetermined threshold values ($-b_N$) are exceeded. A threshold value decisive for initiation of the control is varied as a function of re-acceleration of the controlled wheel.

19 Claims, 4 Drawing Figures

METHOD AND CIRCUIT CONFIGURATION FOR SUPPRESSING UNDESIRED CONTROL ACTIONS IN SLIP-CONTROLLED BRAKE SYSTEMS

BACKGROUND OF THE INVENTION

The present invention relates to a method for suppressing undesired control actions in slip-controlled brake systems, which, for example, may be caused by oscillations of the undercarriage or the axle. The method determines the wheel rotational behavior and controls the braking pressure as a function of slip criteria and/or acceleration criteria and which initiates the slip control when predetermined slip and/or wheel acceleration threshold values are exceeded. Circuit configurations for implementing this method are followed from the present invention.

In vehicles incorporating brake systems with slip control, the rotational behavior of the individual wheels are constantly measured, and further braking pressure rise will be stopped or braking pressure will be decreased on detection of wheel slip of deacceleration values indicative of an imminent locked condition and when specific predetermined threshold values have been exceeded. As soon as the wheel rotational behavior permits, the braking pressure will be re-increased in order to ensure the transmission of the highest braking pressure possible or, respectively, braking action affording a short stopping distance.

To attain an optimal braking behavior, there is need for a control which affords an optimally sensitive and swift reaction on changes in the wheel rotational behavior announcing an imminent locked condition. However, for elimination of inevitable errors and tolerances in the measuring system, in the signal processing etc., the control should not respond until specific values are exceeded.

In addition, oscillations may occur in the wheel suspension under certain conditions which cause relatively great differences between the vehicle speed and the wheel speed as well as positive and negative wheel acceleration values, which falsely indicate an unstable run of the wheel and initiate control actions. That is, sudden variations in the driving torque of a vehicle wheel may bring about excitation of damped oscillations in the drive shaft line--in the undercarriage or in the wheel suspension system--which oscillations are known to be subject to the differential equation for oscillations $$X = X_o \cdot e^{-\delta t} \cos \frac{2\pi t}{T}$$

where X represents the oscillation amplitude and $X_o$ represents the initial value of the oscillation (t=0) and $\sigma$ represents a factor dependent upon the frictional force and the oscillating mass. Such variations of the driving torque take place constantly during control of a vehicle wheel. This is primarily caused because in the initial phase of braking pressure build-up, in which the brake torque is preponderant, the resilient elements of the undercarriage will be preloaded and will be relieved from load abrupty during the phase of braking pressure decrease. As a result thereof, the sensor fitted to the axle and serving to determine the rotational behavior will perform a relative movement towards the sensor wheel co-rotating with the vehicle wheel and will image the decaying oscillation in the speed range. Therefore, evaluation of the sensor signals will recognize speed differences and variations which may initiate control cycles although the vehicle wheel is running stably. Such control actions caused by misinterpretations have adverse effects on the energy consumption of the brake system, on the control comfort and on the braking effect. In the worst case, the undercarriage oscillation may even "build up". Abrupt changes of the frictional values may likewise lead to conditions similar to those caused by oscillations. Furthermore, the vehicle wheels can be alternately deaccelerated and accelerated on so-called bumpy roads. There is the imminent danger that the electronic controller will interpret the deacceleration periods as control periods and will erroneously initiate pressure reduction. It is therefore the object of the present invention to arrange for a method which suppresses unwanted control actions which may be caused in particular by undercarriage or axle oscillations, without decreasing the response sensitivity and the rapidity of the control as a reaction to tendencies to lock.

SUMMARY OF THE INVENTION

This object is achieved in a method of the type initially referred to wherein a threshold value decisive for the initiation of the control is varied in dependence upon the re-acceleration of the controlled wheel. According to an advantageous embodiment of this invention, the re-acceleration of the wheel is constantly monitored and, in the event of this acceleration exceeding a predefined limit value, the threshold value decisive for initiation of the control is increased as a function of the magnitude of the re-acceleration pursuant to a decay time function, i.e. pursuant to an e-function or a linear function, whereby the sensitivity of control will be reduced temporarily. The present invention recognizes that undesired control actions caused by oscillations can be suppressed by variation of a threshold value decisive for initiation of the control, and that the information necessary for the variation of this threshold value can be derived from the re-acceleration of the controlled wheel.

It is important that the resonance frequencies of the axles or of the sprung-mass systems determining the oscillation frequency in known automotive vehicles are confined to relatively close limits of about 10 to 20 hertz. If the threshold value varied according to the present invention is increased in dependence upon the re-acceleration in terms of a reduction of the response sensitivity of the control and is reduced again according to a decay time function—e.g., according to an e-function—the time constant of this function is derived mathematically or empirically from the resonance frequency of the system.

The method and the circuit configuration according to the invention also functions in the event of abrupt changes of frictional values and under irregular road surface conditions. On such roads the vehicle wheels may deaccelerate and accelerate alternately in rapid sequence. In this case, the electronics might interpret the deacceleration periods as unstableness of the wheel and react thereon by reducing the braking pressure. However, in contrast to normal brake slip control, high re-acceleration will occur on bumpy roads and under irregular road surface conditions, since the distance the observed wheel has to cover is longer due to these irregular road surface conditions (e.g., bumps,) than the distance the other wheels have to cover. According to the present invention, this re-acceleration serves to vary the threshold value and to thus diminish the sensitivity of the control temporarily.

BRIEF DESCRIPTION OF THE DRAWING

Further features, advantages and applications of the invention will be gathered from the following description of more details as well as of an embodiment of the invention by way of the accompanying drawing wherein.

DETAILED DESCRIPTION

Figure 1:
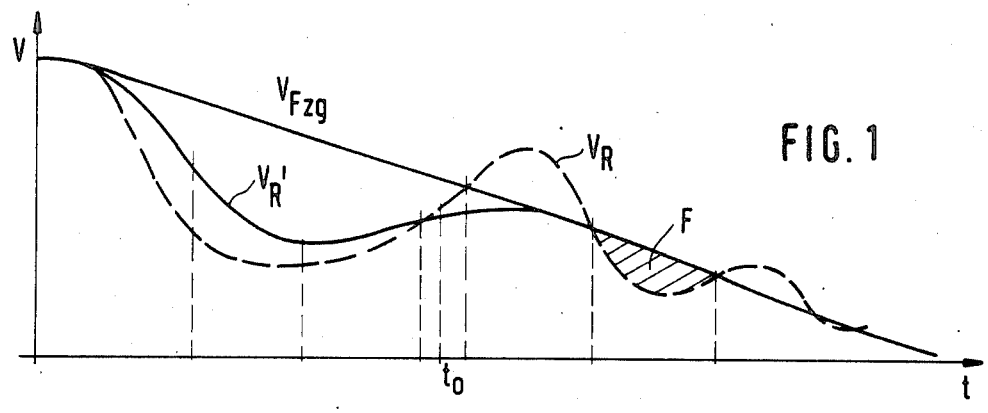
FIG. 1 is a diagram showing the variation of the vehicle speed and the wheel speed plotted against time.

In FIG. 1, $V_{Fzg}$ symbolizes the speed variation of a braked automotive vehicle. The wheel speed $V_R'$ of a controlledly braked wheel in the ideal state is draw in full, while the wheel speed $V_R$ when a damped oscillation is superimposed thereon is drawn in dash lines. In consequence of the axle oscillations, the wheel speed $V_R$ temporarily exceeds the vehicle speed $V_{Fzg}$. Subsequently, the wheel will be deaccelerated again to such an extent that, without taking special measures, a pressure reduction would be initiated in the hatched zone F, although the vehicle wheel is already running stably again.

Figure 2:
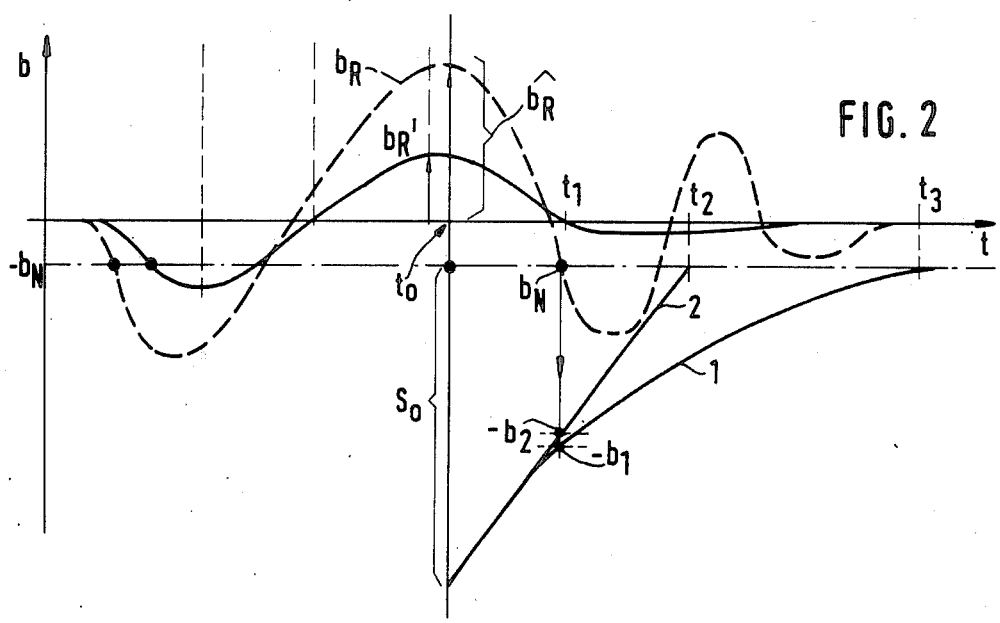
FIG. 2 is a diagram of the variation of the acceleration plotted against time.

As is depicted in FIG. 2 in conjunction with FIG. 1, and in accordance with the present invention, the acceleration of the wheel $b_R$ will be constantly monitored, and the peak value $\hat{}_R$ will be memorized. If the peak value $\hat{}_R$ is in excess of the normal zone and exceeds a predetermined threshold value, the sensitivity of the controller will be decreased instantaneously or after a specific period of time. This is effected, for instance, by variation of the threshold values $-b_N$ which are decisive for the initiation of a pressure decrease cycle.

The variation of the threshold value will be performed according to a time function which is at its maximum at the point of time of the threshold value decrease ($t_o = 0$) and which will decay or decrease in the course of time so that the controller will become more sensitive again after $t > t_o$, until the normal threshold value $-b_N$ is decisive again.

This is illustrated in FIG. 2. At the point of time $t = t_o$, the acceleration $b_R$ of the wheel with the oscillation superimposed thereon has reached its peak value $\hat{b}_R$. This value is above the (non-illustrated) normal zone. Therefore, the switch threshold symbolized by the broken line $-b_N$ will be decreased by the amount $S_o = -K \cdot \hat{b}_R$ at the point of time $t_o$. This sensitivity decrease diminishes with time, suitably according to an e-function or exponential function as per curve 1 or, for the sake of simplicity, linearly as per curve 2.

Said curve 1 is defined in approximation by the relation $$S = S_o \cdot e^{\frac{-t}{T}}$$

the maximum value $S_o$ being proportional to the peak value $\hat{b}_R$ of the acceleration, while T implies the time constant of the dampedly oscillating system.

The curve 2 is a straight line, the gradient thereof being predetermined by the quotient $S_o/t_2$.

Owing to the temporary decrease of the sensitivity of the controller or, respectively, owing to the increase of the threshold value decisive for the initiation of pressure reduction according to curve 1 or curve 2 in FIG. 2, the pressure reduction will be suppressed which, without the inventive steps, would commence at the point of time $t_1$, at which the acceleration $b_R$ has attained the threshold value $-b_N$. Pressure reduction will not take place any more in the illustrated example of a controlled braking action, although the sensitivity of the controller has increased again to the initial value at the point of time $t_2$ (when curve 2 applies) or in approximation at the point of time $t_3$ (when the e-function according to curve 1 applies).

Figure 3:
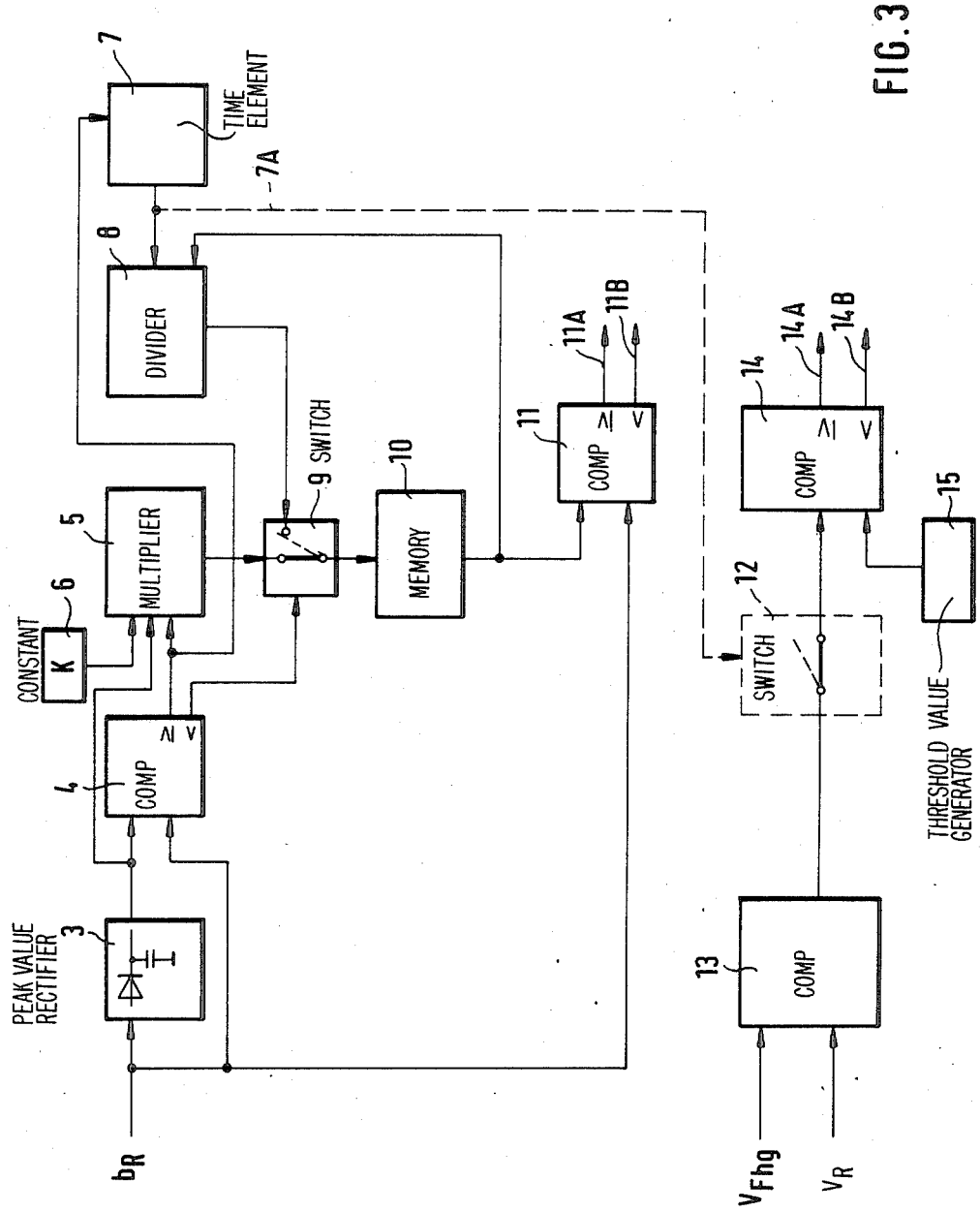
FIG. 3 is a schematic diagram of a circuit configuration for implementing the method according to the invention; and, FIG. 4 is a diagram of different time functions when using an integrator.

FIG. 3 shows a realization of a circuit configuration for implementing the method. In the embodiment described herein, the acceleration signal $b_R$ is supplied to a peak value rectifier 3 and is continuously compared to the maximum or peak value generated in the stage 3 by means of the comparator 4. If the peak value $b_R$ is reached at the output of the rectifier 3 and if this value is in excess of a predetermined limit value or normal value, the peak value $\hat{}_R$ will be multiplied in the multiplier 5 by the constant K of the stage 6, and a time element 7 will be initiated which puts a divider 8 into operation. Moreover, the product K·$\hat{}_R$ is supplied via a switch 9 into a memory 10 and into the divider 8.

Subsequently, the switch 9 will be shifted, and the divider causes the function K·$\hat{}_R/t$.

This value will be supplied via the memory 10 to a second comparator 11 and will be compared there with the instantaneous value $b_R$. The comparator 11 defines the switch threshold for the commencement of pressure reduction; a signal at the output 11 A causes further rise of the braking prerssure or has the pressure kept constant, while a signal at the output 11 B causes pressure reduction.

By way of the dotted signal line 7A and a switch 12, it is furthermore possible to influence a slip criterion generated in a comparator 13 by comparison of the wheel speed $V_R$ with the vehicle speed $V_{Fzg}$ or reference speed or, as is shown in FIG. 3, to separate it temporarily from the input of a comparator 14 which latter compares the slip signal with a threshold value generated in the stage 15 and admits via its outputs 14 A, 14 B that pressure is reduced, kept constant or increased. The circuit configuration according to FIG. 3 likewise permits to be substituted by a computer which effects the logic combining of the speed signal and acceleration signals by means of software in a manner know per se.

The shifting of the threshold values decisive for the initiation of pressure reduction or, respectively, the diminution of the controller sensitivity is limited not only to the acceleration threshold values, but can likewise be accomplished within the electronics by correspondingly influencing derived quantities. It would be sufficient, for instance, if within the electronic processing, an integrator became "elevated" by a specific amount which latter corresponds to the threshold value varied in dependence upon the re-acceleration, and if it were ensured that this integrator will always be automatically set to zero in a short time, corresponding to the time $t_2$ or $t_3$ in FIG. 2, by means of corresponding feedback.

Figure 4:
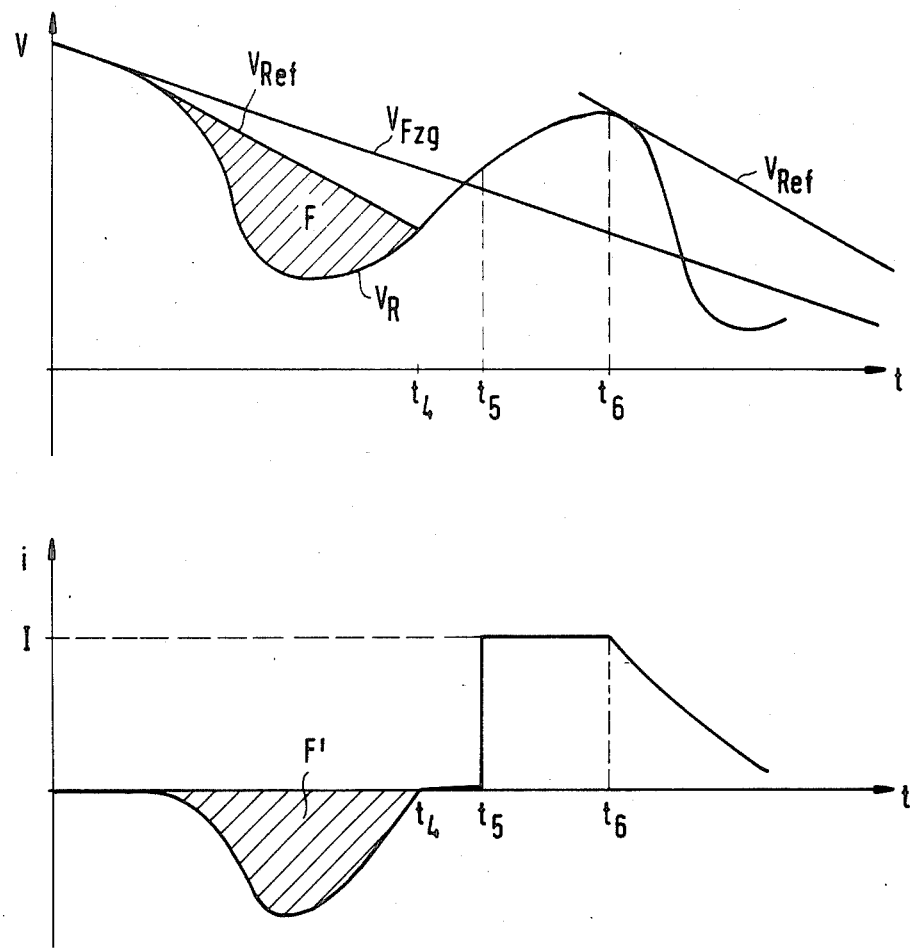

FIG. 4 illustrates the procedure when an integrator is made use of. In the upper diagram in FIG. 4, the speed $V_R$ of a controlledly braked wheel again is plotted against the time t. $V_{Fzg}$ refers to the vehicle speed. In this embodiment, the vehicle reference speed $V_{Ref}$ serves as a reference value for the determination of the braking pressure control variables during specific control periods, in particular in the period of deacceleration, which vehicle reference speed can be given e.g. by a straight line with the gradient $-1g$, the letter g referring to the gravitational constant ($g=9,81$ ms$^{-2}$).

In the lower diagram in FIG. 4, the value of integration or, respectively, the value i at the output of the integrator is drawn as a function of time. Until the point of time $t_4$, i corresponds to the difference between the wheel speed $V_R$ and the reference value $V_{Ref}$. Therefore, the surface areas F and F' are equal. At the point of time $t_5$, the re-accleration has reached the limit value in the embodiment shown so that the threshold value decisive for initiation of the control will be varied pursuant to the inventive method. In this arrangement, this is performed by "elevation" of the integrator by the value I at the point of time $t_5$. Inventively, I is dependent upon the peak value of the re-acceleration $_R$, as was described by way of FIG. 2.

The decrease of the threshold value increase will commence in the embodiment according to FIG. 4 at the point of time $t_6$, upon attainment of which the wheel speed $V_R$ of the re-accelerated wheel will decrease again. Analogously to the examples described hereinabove, the resetting of the integrator can be performed according to an e-function or linearly by means of a gradient conformed to the time constant of the oscillating system. It will suffice, however, in many cases to set the integrator automatically to zero by means of feedback. A resetting action independence upon the wheel motion in comparison to the vehicle speed is likewise expedient. Such integrating processes can likewise be performed as program stages when programmed electronics is used.

What is claimed is:

1. A method for suppressing undesired control actions in slip-controlled brake systems for vehicals having wheels, which control actions are caused by oscillations of the undercarriage or the axle of said vehicle, wherein the method determines the wheel rotational behavior and controls the braking pressure of said brake systems wherein the controlled wheel decelerates and re-accelerates during the application of braking pressure as a function of accleration criteria and which initiates slip control of a wheel when predetermined acceleration threshold values are exceeded, wherein said method includes the step of varying a threshold value required for initiation of the control as a function of the re-acceleration of the controlled wheel of said vehicle.

2. A method as claimed in claim 1, wherein the re-acceleration is constantly monitored and when the re-acceleration exceeds a predetermined limit value, the threshold value determining the initiation of the control is increased as a function of the magnitude of re-acceleration pursuant to a decreasing function as time increases, whereby the sensitivity of control will be temporarily reduced thereby.

3. A method as claimed in claim 2, wherein the threshold value required for initiation of the control is increased as soon as the re-acceleration exceeds the limit value.

4. A method as claimed in claim 2, wherein the threshold value required for initiation of the control is increased with delay when the re-acceleration exceeds the limit value.

5. A method as claimed in claim 4, wherein the increase of the threshold value required for initiation of the control begins at the commencement of the period of braking pressure decrease which immediately follows the termination of re-acceleration.

6. A method as claimed in claim 5, wherein the threshold value is increased by a value proportional to the peak value of re-acceleration.

7. A method as claimed in claim 6, wherein the increase of the threshold value diminishes linearly in approximation.

8. A method as claimed in claim 7, wherein the threshold value is increased in approximation to the functions $S-S_o(1-t/T)$ wherein S is the increase of the threshold value, $S_o$ is the initial value ($t=0$) of the threshold value increase, and T is the time constant of the sprung-mass system of the vehicle which determines the oscillation frequency of the vehicle.

9. A method as claimed in claim 2, wherein the increase of the threshold value is diminished in approximation of an exponential function.

10. A method as claimed in claim 9, wherein the threshold value is increased in approximation to the function $S=S_o \cdot e - t/T$ wherein S is the increase of the threshold value, $S_o$ is the initial value ($t=0$) of the threshold value increase, and T is the time constant of the sprung-mass system of the vehicle which determines the oscillation frequency of the vehicle.

11. A method as claimed in claim 1, wherein at least one of the acceleration threshold value and the slip threshold value is varied in dependence upon re-acceleration.

12. A circuit configuration for implementing a method for suppressing undesired control actions in slip-controlled brake systems for vehicles having a controlled wheel deceleration and re-acceleraion during the application of braking pressure, said circuit comprising: means for providing a quantity proportional to a peak value ($_R$) of re-acceleration and means for providing a quantity proportional to the peak value ($_R$) multiplied by a predetermined factor (K); first comparator means (4) for comparing the quantity proportional to the peak value ($_R$) with the instantaneous wheel acceleration ($b_R$) and outputting a signal in proportion thereto; a memory (10) for storing said peak value multiplied by a predetermined factor (K) and a time element (7) whose time function is combined with the stored value and providing a time-controlled output quantity; and, means including a second comparator (11) for comparing said output quantity with the instantaneous accleration ($b_R$) for providing an output connected to control means for controlling the braking pressure variation and which varies the initiation of the control in response to re-acceleration.

13. A circuit configuration as claimed in claim 12, wherein an additional switch stage (12) is provided which is alternately connected to the output of the time element (7), which switch stage provides a slip criterion for the duration of the output signal applied to the time element (7), said slip criterion being derived from comparison of the vehicle reference speed ($V_{Fzg}$) with the wheel speed ($V_R$).

14. A circuit configuration as claimed in claim 12, including an integrator which is supplied with the difference of the wheel speed ($V_R$) from a reference value such as the vehicle reference speed ($V_{Ref}$), and the output value (i) which is varied as a function of re-acceleration, and the output value (i) which controls the braking pressure variation.

15. A circuit configuration as claimed in claim 14, wherein the output value (i) of the integrator is varied by a predetermined value in the direction of reduced response sensitivity of the control when the re-acceleration of the wheel exceeds a limit value, and wherein the integrator is reset immediately after the output value of the integrator is varied.

16. A circuit configuration as claimed in claim 15, wherein the output value (i) of the integrator is automatically reset to zero after the output value of the integrator is varied.

17. A circuit configuration as claimed in claim 15, whereien the resetting of the integrator output value (i) starts immediately after the output value of the integrator is varied.

18. A circuit configuration as claimed in claim 15, wherein the resetting of the integrator output value (i) starts after an acceleration threshold value has been exceeded.

19. A circuit configuration as claimed in claim 14, wherein the output value (i) of the integrator is varied by a predetermined value in the direction of reduced response sensitivity of the control when the re-acceleration of the wheel exceeds a limit value, and wherein the integrator is reset within a predetermined delay after the output value of the integrator is varied.

* * * * *